US012091810B2

(12) United States Patent
Kim et al.

(10) Patent No.: US 12,091,810 B2
(45) Date of Patent: Sep. 17, 2024

(54) LAUNDRY TREATMENT APPARATUS

(71) Applicant: LG Electronics Inc., Seoul (KR)

(72) Inventors: Hyeonjoong Kim, Seoul (KR); Seungjoon Kim, Seoul (KR); Minji Kim, Seoul (KR); Hyojun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 17/467,003

(22) Filed: Sep. 3, 2021

(65) Prior Publication Data

US 2022/0074115 A1 Mar. 10, 2022

(30) Foreign Application Priority Data

Sep. 4, 2020 (KR) ........................ 10-2020-0113076

(51) Int. Cl.
*D06F 58/20* (2006.01)
*D06F 58/02* (2006.01)
(Continued)

(52) U.S. Cl.
CPC ............... *D06F 58/20* (2013.01); *D06F 58/02* (2013.01); *D06F 58/08* (2013.01); *F16D 3/06* (2013.01); *F16D 13/52* (2013.01)

(58) Field of Classification Search
CPC .......... D06F 58/20; D06F 58/02; D06F 58/08; D06F 37/30; D06F 37/42; F16D 3/06; F16D 13/52
See application file for complete search history.

(56) References Cited

U.S. PATENT DOCUMENTS 6,971,189 B1 12/2005 Anibas
11,131,054 B2 * 9/2021 Jeong ..................... D06F 37/06
(Continued)

FOREIGN PATENT DOCUMENTS

CN 103696206 4/2014
EP 3556927 A1 * 10/2019 ............. D06F 37/04
(Continued)

OTHER PUBLICATIONS

Translation KR-20170049563-A (Year: 2017).*
(Continued)

*Primary Examiner* — Jessica Yuen
(74) *Attorney, Agent, or Firm* — Fish & Richardson P.C.

(57) ABSTRACT

A laundry treatment apparatus includes: a housing defining a reception space, a first through-hole in communication with the reception space and defined at a first surface of the housing, a second through-hole in communication with the reception space and defined at a second surface facing the first surface, a driver including (i) a driving shaft rotatably fixed to the second through-hole and defining a concentric shaft and (ii) a motor configured to rotate the driving shaft, a connection shaft fastening portion disposed at the driving shaft, defining a space, and configured to transmit rotational motion of the driving shaft, and a support configured to be elastically deformed between a second connection body and the second surface and configured to press the second connection body toward the first connection body such that the first connection body is coupled to a fastening body.

20 Claims, 10 Drawing Sheets

(51) Int. Cl.
  *D06F 58/08* (2006.01)
  *F16D 3/06* (2006.01)
  *F16D 13/52* (2006.01)

(56) References Cited

U.S. PATENT DOCUMENTS

2010/0018257 A1    1/2010   Chang
2017/0284007 A1    10/2017   Hirota et al.
2018/0347096 A1    12/2018   Yoneda et al.

FOREIGN PATENT DOCUMENTS

| JP | 2011-101725 | 5/2011 |
| JP | 2013027613 | 2/2013 |
| JP | 2017-099604 | 6/2017 |
| KR | 101220214 | 1/2013 |
| KR | 20170049563 A | * 10/2017 |
| KR | 101892012 | 8/2018 |
| KR | 20200066169 | 6/2020 |
| WO | WO2016050295 | 4/2016 |

OTHER PUBLICATIONS

Office Action in Japanese Appln. No. 2023-514487, mailed on Dec. 5, 2023, 8 pages (with English translation).
Extended European Search Report in European Appln. No. 21194767.6, dated Dec. 14, 2021, 7 pages.
International Search Report and Written Opinion in International Appln. No. PCT/KR2021/011925, dated Dec. 27, 2021, 8 pages.

* cited by examiner

LAUNDRY TREATMENT APPARATUS

CROSS-REFERENCE TO RELATED APPLICATION

This application claims the benefit of Korean Patent Application No. 10-2020-0113076, filed on Sep. 4, 2020, which is hereby incorporated by reference as if fully set forth herein.

TECHNICAL FIELD

The present disclosure relates to a laundry treatment apparatus.

BACKGROUND

Generally, a laundry treatment apparatus may refer to an apparatus for washing laundry, an apparatus for drying wet or washed laundry, and/or an apparatus for performing washing and drying of laundry.

A washing machine may include a tub to store water, a washing drum provided in the tub to store laundry, a lifter protruding from a circumferential surface of the washing drum to agitate laundry, a door provided to open or close an inlet communicating with the washing drum, and a driver (also called a washing driver) to rotate the washing drum. A drying machine may include a drying drum to store laundry, a lifter protruding from a circumferential surface of the drying drum to agitate laundry, a door provided to open or close an inlet communicating with the drying drum, a driver (also called a drying driver) to rotate the drying drum, and a heat exchanger to dehumidify moisture from the laundry by supplying air to the drying drum.

In operation of the washing machine or the drying machine, external force for pushing the washing drum or the drying drum in a direction (i.e., in a direction along which the driver of each machine is located) away from the inlet of each drum may be applied to the washing drum or the drying drum. The external force may occur due to various reasons such as an undesirable state in which the drum rotates in a situation where laundry is unexpectedly caught in a spacing between the door and the lifter. Such external force may cause unexpected load of the washing driver or the drying driver, so that the unexpected load may allow the washing driver or the drying driver to erroneously operate or to have poor durability.

Generally, whereas the washing driver of the conventional washing machine may include a stator fixed to the tub to generate a rotating magnetic field, a rotor configured to rotate by the rotating magnetic field, and a rotary shaft configured to interconnect the washing drum and the rotor by penetrating the tub, the drying driver of the conventional drying machine may include a motor, a pulley fixed to a rotary shaft of the motor, and a belt (i.e., a power transmission unit) configured to supply rotational motion of the pulley to the drying drum.

Generally, the conventional washing driver may be configured to interconnect the washing drum and the rotor through the rotary shaft of the motor. In order to wash or dehydrate laundry, the washing driver should control the washing drum to rotate at a high RPM (revolutions per minute) or should perform switching of a rotation direction of the washing drum. Therefore, assuming that the washing drum and the rotor are directly connected to each other through the rotary shaft of the motor, the number of revolutions (e.g., RPM) and the rotation direction of the washing drum can be easily controlled. Generally, the conventional drying driver may be configured to interconnect the drying drum and the rotary shaft of the motor through a power transmission unit such as a belt. There is little need for the drying machine to continuously maintain a high RPM of the drying drum or to change the rotation direction of the drying drum, so that no problems may occur in the case where the drying drum rotates through the power transmission unit such as a belt. However, assuming that the RPM and the rotation direction of the drying drum are changed, it is possible to control movement of laundry in the drying drum, so that a total drying time of the drying machine can be shortened and drying performance of the drying machine can increase.

SUMMARY

Accordingly, the present disclosure is directed to a laundry treatment apparatus that substantially obviates one or more problems due to limitations and disadvantages of the related art. An object of the present disclosure is to provide a laundry treatment apparatus capable of minimizing load of a driver.

Another object of the present disclosure is to provide a laundry treatment apparatus provided with a clutch that blocks a connection between a drum and a driver when the magnitude of external force applied to the drum is equal to or greater than a predetermined reference value.

Another object of the present disclosure is to provide a laundry treatment apparatus provided with a driver that decelerates a rotational speed of a rotor and transmits the decelerated rotation speed to the drum, so that the center of rotation of the rotor and the center of rotation of the drum are disposed at a concentric shaft of the driver.

Another object of the present disclosure is to provide a laundry treatment apparatus capable of minimizing a volume of the driver.

In accordance with one aspect of the present disclosure, a laundry treatment apparatus may include a housing configured to include a reception space, a first through-hole configured to communicate with the reception space by penetrating a first surface of the housing, a second through-hole configured to communicate with the reception space by penetrating a second surface facing the first surface from among a space provided by the housing, a first connection portion configured to include a first connection body rotatably provided in the reception space, a first connection shaft inserted into the first through-hole, and a connection shaft through-hole formed to penetrate the first connection shaft, a second connection portion configured to include a second connection body provided in the reception space to reciprocate between the first surface and the second surface, a fastening body provided in the second connection body to be detachably coupled to the first connection body, and a second connection shaft protruding from the second connection body toward the second through-hole, a drum configured to provide a space in which laundry is stored, a drum shaft, one end of which is fixed to the drum and the other end of which is inserted into the connection shaft through-hole, configured to interconnect the drum and the first connection shaft, a driver configured to include a driving shaft rotatably fixed to the second through-hole to form a concentric shaft along with the drum shaft, and a motor to rotate the driving shaft, a connection shaft fastening portion provided in the driving shaft to provide a space in which a free end of the second connection shaft is inserted, and configured to transmit rotational motion of the driving shaft to the second connection shaft, and a support configured to be elastically deformed between the second connection body and the second surface, and to provide force by which the second connection body is pressed in a direction in which the first connection body is disposed so that the first connection body is coupled to the fastening body.

The support may include a first bearing housing fixed to the second connection body, a second bearing housing connected to the first bearing housing through a ball or a roller, and a spring, one end of which is fixed to the second bearing housing and the other end of which is fixed to the second surface.

Each of the first bearing housing and the second hearing housing may be formed in a ring shape.

The laundry treatment apparatus may further include a body fastening groove provided at a circumferential surface of the first connection body formed in a disc shape, and a body fastening protrusion provided in the fastening body and detachably coupled to the body fastening groove.

The laundry treatment apparatus may further include a frictional force providing portion provided in the fastening body to increase frictional force between the first connection body and the second connection body.

The frictional force providing portion may include at least one of a first contact plate formed in a disc shape made of rubber and a second contact plate formed in a disc shape made of metal.

The laundry treatment apparatus may further include a contact plate fastening groove provided at a circumferential surface of the second contact plate so that the fastening protrusion is detachably coupled thereto.

The laundry treatment apparatus may further include a tub configured to provide a space in which water is stored, and provided with one surface to which the housing is fixed, wherein the drum is provided in the tub.

The laundry treatment apparatus may further include a supply unit configured to remove moisture from laundry stored in the drum by supplying air to the drum.

In accordance with another aspect of the present disclosure, a laundry treatment apparatus may include a housing fixed to a fixing panel and configured to include a reception space, a first through-hole configured to communicate with the reception space by penetrating a first surface of the housing; a second through-hole configured to communicate with the reception space by penetrating a second surface facing the first surface from among a space provided by the housing, a first connection portion configured to include a first connection body rotatably provided in the reception space, a first connection shaft inserted into the first through-hole, and a connection shaft through-hole formed to penetrate the first connection shaft, a second connection portion configured to include a second connection body provided in the reception space to reciprocate between the first surface and the second surface, a fastening body provided in the second connection body to be detachably coupled to the first connection body, and a second connection shaft protruding from the second connection body toward the second through-hole to form a concentric shaft along with the first connection shaft, a drum configured to provide a space in which laundry is stored, a drum shaft, one end of which is fixed to the drum by penetrating the fixing panel and the other end of which is inserted into the connection shaft through-hole, configured to form a concentric shaft along with the second connection shaft, a motor configured to include a stator fixed to the fixing panel to form a rotating magnetic field, a rotor rotated by the rotating magnetic field, and a driving shaft rotated by the rotor to form a concentric shaft along with the second connection shaft, a decelerator disposed between the second connection shaft and the driving shaft to transmit rotational motion of the driving shaft to the second connection shaft so that the number of revolutions per minute (RPM) of the second connection shaft becomes lower than the number of revolutions per minute (RPM) of the driving shaft, and a support configured to be elastically deformed between the second connection body and the second surface, and to provide force by which the second connection body is pressed in a direction in which the first connection body is disposed so that the first connection body is coupled to the fastening body.

The decelerator may include a deceleration housing formed in a hollow cylindrical shape fixed to the fixing panel, a ring gear fixed in the deceleration housing, a main gear fixed to the driving shaft and provided in the deceleration housing, a base provided in the deceleration housing, a base shaft, one end of which is located outside the deceleration housing by penetrating the deceleration housing and the other end of which is fixed to the base, configured to form a concentric shaft along with the driving shaft, a slave gear configured to include a first body rotatably fixed to the base, a first gear provided at a circumferential surface of the first body and coupled to the main gear, a second body fixed to the first body and formed to have a smaller diameter than the first body, and a second gear provided at a circumferential surface of the second body and coupled to the ring gear, and a connection shaft fastening portion provided at one end of the base shaft to provide a space in which a free end of the second connection shaft is inserted, and to transmit rotational motion of the base shaft to the second connection shaft.

The diameter of the first gear may be longer than a diameter of the main gear, and the diameter of the second gear may be longer than the diameter of the main gear and is shorter than the diameter of the first gear.

The deceleration housing may include a first deceleration housing formed in a cylindrical shape having an opened surface facing the fixing panel so that the driving shaft is rotatably fixed thereto, a second deceleration housing formed in a cylindrical shape and disposed between the first deceleration housing and the fixing panel so as to allow the base shaft to be rotatably fixed thereto, and configured to close an opened surface of the first deceleration housing by connecting to the first deceleration housing, a driving shaft support formed to protrude from the first deceleration housing toward the second deceleration housing, a driving shaft through-hole configured to penetrate the driving shaft support so that the driving shaft is inserted therein, and a driving shaft bearing configured to allow the driving shaft to be rotatably fixed to the driving shaft support.

The driving shaft bearing may include a first driving-shaft bearing and a second driving-shaft bearing which are provided in a longitudinal direction of the driving shaft.

The laundry treatment apparatus may further include a base shaft support fixed to the second deceleration housing, a base shaft through-hole formed to penetrate the base shaft support so that the base shaft is inserted therein, and a first base-shaft bearing and a second base-shaft bearing configured to allow the base shaft to be rotatably fixed to the base shaft support, and provided in a longitudinal direction of the base shaft.

The support may include a first bearing housing fixed to the second connection body, a second bearing housing connected to the first bearing housing through a ball or a roller, and a spring, one end of which is fixed to the second hearing housing and the other end of which is fixed to the second surface.

As is apparent from the above description, the laundry treatment apparatus according to the embodiments of the present disclosure can minimize load of the driver.

The laundry treatment apparatus may include a clutch that is capable of blocking a connection between the drum and the driver when the magnitude of external force is equal to or greater than a predetermined reference value.

The laundry treatment apparatus may include a driver that decreases a rotation speed of a rotor and transmits the decreased rotation speed to the drum, so that the center of rotation of the rotor and the center of rotation of the drum are disposed at a concentric shaft of the driver.

The laundry treatment apparatus can minimize a volume of the driver.

DETAILED DESCRIPTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Figure 1:
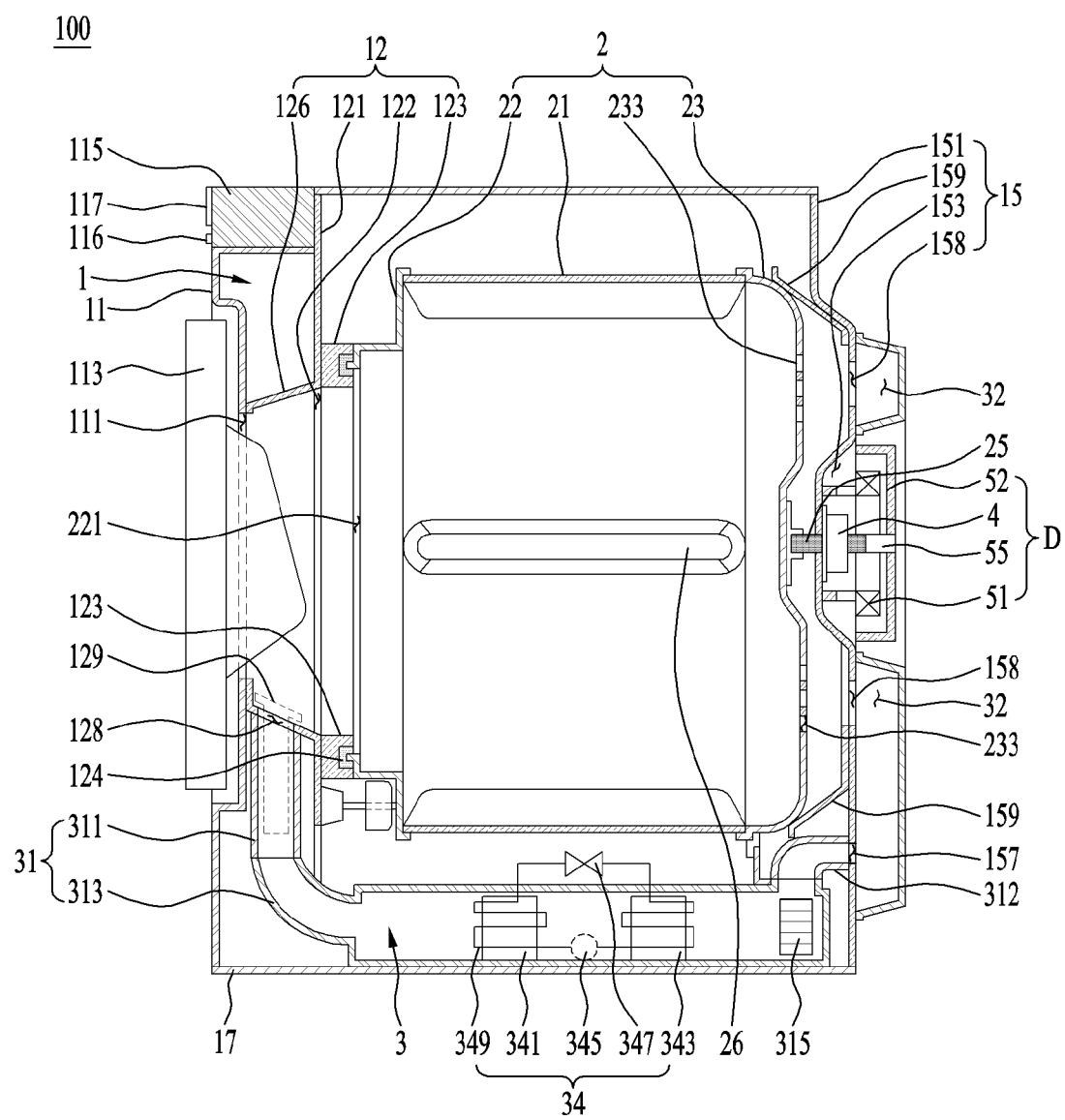
FIGS. 1 and 2 are schematic diagrams illustrating examples of a laundry treatment apparatus according to the present disclosure.

FIG. 1 is a schematic diagram illustrating an example of a laundry treatment apparatus 100. The laundry treatment apparatus 100 may include a cabinet 1, a drum 2 rotatably provided in the cabinet 1 to provide a space in which laundry (to be washed or to be dried) is stored, a supply unit 3 to remove moisture or humidity from laundry by supplying high-temperature drying air (e.g., air having a higher temperature than room temperature, or air having a higher dryness than room temperature) to the drum 2, and a driver D to rotate the drum.

The cabinet 1 may include a front panel 11 forming a front surface of the laundry treatment apparatus, and a base panel 17 forming a bottom surface of the laundry treatment apparatus. The front panel 11 may include an inlet 111 formed to communicate with the drum 2. Here, the inlet 111 may be closed by a door 113.

The front panel 11 may include a control panel 115. The control panel 115 may include an input unit 116 to receive a control command from a user, and a display unit 117 to output (or display) information such as a user-selectable control command. The input unit 116 may include a power-supply request unit to request power supply from the laundry treatment apparatus, a course input unit to enable the user to select a desired course from among a plurality of courses, and an execution request unit to request initiation of the course selected by the user.

The drum 2 may be formed in a hollow cylindrical shape. Referring to FIG. 1, the drum 2 may include a cylindrical drum body 21, a front surface and a rear surface of which are opened, a front cover 22 forming the front surface of the drum body 21, and a rear cover 23 forming the rear surface of the drum body 21. The front cover 22 may include a drum inlet 221 for enabling the inside of the drum body 21 to communicate with the outside of the drum body 21.

The drum body 21 may include a lifter 26 to agitate laundry. The lifter 26 may be implemented as a board that protrudes from a circumferential surface of the drum body toward the center of rotation of the drum body. The lifter 26 may include a plurality of boards spaced apart from each other by a predetermined distance.

The drum 2 may be rotatably fixed to at least one of a front support 12 and a rear support 15. In FIG. 1, the rear cover 23 may be rotatably fixed to the rear support 15 through a drum shaft 25 and the driver D, and the front cover 22 may be rotatably connected to the front support 12.

The front support 12 may be fixed to the cabinet 1 so that the front support 12 is disposed between the front panel 11 and the front cover 22. As can be seen from FIG. 1, the front support 12 may be fixed to the base panel 17 so that the front support 12 is disposed between the front panel 11 and the front cover 22. In this case, the rear surface (facing the front support 12) of the front panel 11 may be fixed to the front support 12, and may be fixed to the base panel 17.

The front support 12 may include a support panel 121, a support panel through-hole 122 formed to penetrate the support panel 121, a drum connection body 123 formed to interconnect the support panel through-hole 122 and the drum inlet 221, and a panel connection body 126 formed to interconnect the support panel through-hole 122 and the inlet 111. The inlet 111 and the drum inlet 221 may be formed to communicate with each other through the support panel through-hole 122.

The drum connection body 123 may be implemented as a pipe that is fixed to the rear surface (facing the drum inlet from among the space provided by the support panel) of the support panel 121. One end of the drum connection body 123 may be fixed to the support panel to surround the support panel through-hole 122, and a free end of the drum connection body 123 may be provided to support the front cover 22.

In other words, the free end of the drum connection body 123 may be inserted into the drum inlet 221 to support the front cover, or may be provided to contact the free end of the front cover 22 forming the drum inlet 221. FIG. 1 illustrates one example in which the free end of the drum connection body 123 is in contact with the free end of the front cover 22. In this case, the drum connection body 123 may include a ring-shaped damper (also called a connection damper) 124. The connection damper 124 may minimize the risk that the drum inlet 221 is separated from the drum connection body 123 when the drum 2 rotates or vibrates, so that the possibility of air leaking from the drum toward the cabinet can also be minimized.

The connection damper 124 may be formed of a compressible material, the volume of which can increase or decrease by external force. In this case, the connection damper 124 may be provided to maintain a compressed state between the free end of the drum connection body 123 and the edge (i.e., the free end of the front cover) of the drum inlet 221. As a result, the possibility that the drum inlet 221 is separated from the drum connection body 123 when the drum 2 vibrates between the front support 12 and the rear support 15 can be minimized. A felt manufactured by compression of fibers may be an example of the connection damper 124.

The panel connection body 126 may be implemented as a pipe that is fixed to the front surface (facing the front panel from among the space provided by the support panel) of the support panel 121. One end of the panel connection body 126 may be provided to surround the support panel through-hole 122, and the other end of the panel connection body 126 may be connected to the inlet 111. Therefore, laundry supplied to the inlet 111 may move to the drum body 21 through the panel connection body 126, the support panel through-hole 122, the drum connection body 123, and the drum inlet 221.

The rear support 15 may be fixed to the cabinet 1 in a manner that the rear support 15 is arranged to be spaced apart from the rear cover 23. FIG. 1 illustrates one example in which the rear support 15 is fixed to the base panel 17, resulting in formation of the rear surface (i.e., the rear surface of the cabinet) of the laundry treatment apparatus 100.

Figure 2:
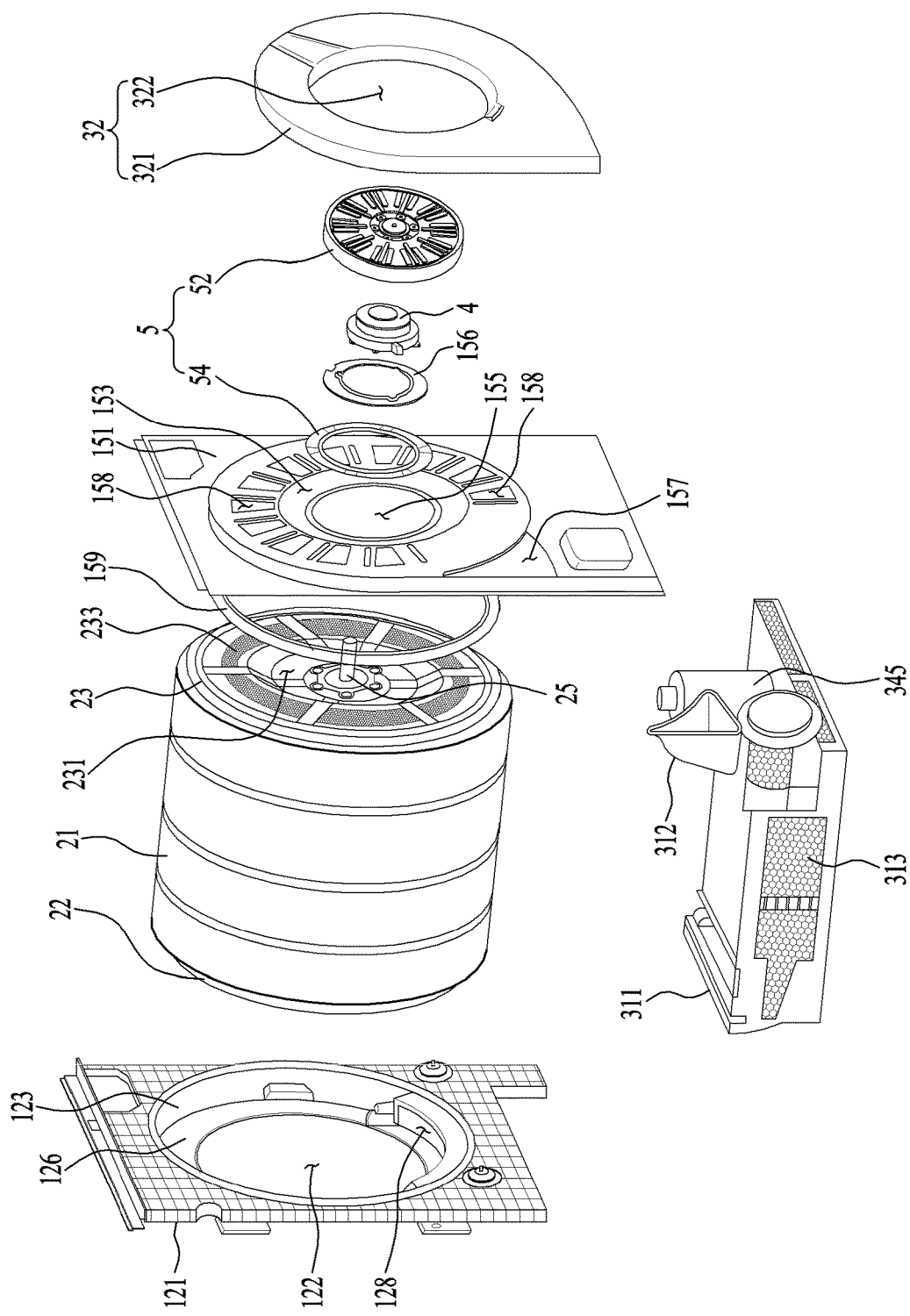

Referring to FIG. 2, the rear support 15 may include a fixing panel 151 forming the rear surface of the cabinet, and a driver mounting groove 153 provided in the fixed panel 151 in a manner that the driver D is mounted to the driver mounting groove 153. The driver mounting groove 153 may be implemented as a groove formed when the fixing panel 151 is concavely curved toward the rear cover 23 of the drum. The fixing panel 151 may include a fixing panel through-hole 155 through which the rotary shaft of the drum 2 passes, and the fixing panel through-hole 155 may be disposed in the driver mounting groove 153.

The support panel 121 may include a drum exhaust port (e.g., a first exhaust port 128) configured to penetrate the panel connection body 126. The fixing panel 151 may include a panel exhaust port (e.g., a second exhaust port 157) and a support port 158.

The supply port 158 may be configured in a manner that the supply holes formed to penetrate the fixing panel 151 surround the driver mounting grove 153. Here, the supply holes may be configured to form a ring surrounding the driver mounting groove.

Referring to FIG. 1, a supply unit 3 may include an exhaust duct 31 for connecting the first exhaust port 128 to the second exhaust port 157, a supply duct for guiding air discharged from the second exhaust port 157 to the supply port 158, and a heat exchanger 34 provided in the exhaust duct to sequentially perform dehumidification and heating of the air. The first exhaust port 128 may include a filter 129 to filter air moving in the direction from the drum 2 to the exhaust duct 31.

The exhaust duct 31 may include a first duct 311 connected to the first exhaust port 128, a second duct 312 connected to the second exhaust port 157, and a third duct 313 configured to interconnect the first duct 311 and the second duct 312. The third duct 313 may be fixed to the base panel 17.

The exhaust duct 31 may include a fan 315 for allowing air inside the drum 2 to flow into the second exhaust port 157. FIG. 1 illustrates one example in which the fan 315 is disposed between the heat exchanger 34 and the second duct 312.

The heat exchanger 34 may be implemented as various devices capable of sequentially performing dehumidification and heating of air introduced into the exhaust duct 31. FIG. 1 illustrates one example in which the heat exchanger 34 is implemented as a heat pump.

That is, the heat exchanger 34 shown in FIG. 1 may include a first heat exchanger (i.e., a heat absorption unit 341) for dehumidifying the air introduced into the exhaust duct 31, and a second heat exchanger (i.e., a heating unit 343) provided in the exhaust duct 31 to heat the air having penetrated the heat absorption unit 341.

The heat absorption unit 341 and the heating unit 343 may be sequentially arranged in the direction of air flow, so that the heat absorption unit 341 and the heating unit 343 may be connected to each other through a refrigerant pipe 349 forming a circulation passage of the refrigerant. The refrigerant may move along the refrigerant pipe 349 by a compressor 345 located outside the exhaust duct 31. The refrigerant pipe 349 may include a pressure regulator 347 to adjust a pressure of the refrigerant flowing from the heating unit 343 to the heat absorption unit 341.

The heat absorption unit 341 may transmit heat of air introduced into the exhaust duct 31 to the refrigerant, so that the air is cooled and the refrigerant is evaporated. The heating unit 343 may transmit heat of the refrigerant having penetrated the compressor 345 to the air, so that the air is heated and the refrigerant is condensed.

Referring to FIG. 2, the supply duct 32 may be fixed to the fixing panel 151, so that the supply duct 32 can guide the air discharged from the second exhaust port 156 to the supply port 158.

When the supply port 158 is implemented as a plurality of supply holes arranged in a ring shape, the supply duct 32 may include a duct body 321 fixed to the fixing panel 151 to interconnect the second exhaust port 157 and the supply port 158, and a rotor receiving unit 322 configured to penetrate the duct body 321. The driver D fixed to the driver mounting groove 153 may be exposed to the outside of the supply duct by the rotor reception portion 322. The driver D fixed to the driver mounting groove 153 may be exposed outside the supply duct 32 by the rotor receiving portion 322, so that the driver D can be cooled.

The drum 2 may include an air inlet 233 formed to penetrate the rear cover 23, so that air supplied to the inside of the cabinet 1 can flow into the drum 2. The fixing panel 151 may include a flow passage forming portion 159 to guide air discharged from the supply port 158 to the air inlet 233.

The air inlet 233 may be configured in a manner that several holes penetrating the rear cover 23 form the ring surrounding the center of rotation of the drum 2. The flow passage forming portion 159 may be implemented as a pipe in which one end (i.e., one end fixed to the fixing panel) surrounds the supply port 158 and the other end (i.e., one end contacting the drum) surrounds the air inlet. In order to minimize vibrations that are generated by rotation of the drum 2 and then applied to the fixing panel 151, the flow passage forming portion 159 may be formed of a high-elasticity material such as rubber.

Although not shown in the drawings, the supply unit 3 may include an exhaust duct for connecting the first exhaust port 128 to the second exhaust port 157, a supply duct for supplying external air (e.g., air inside the cabinet or air outside the cabinet) to the drum 2, and a heat exchanger for heating air introduced into the supply duct.

Referring to FIG. 1, the driver D may be provided as a motor fixed to the driver mounting groove 153, and the drum 2 may be connected to the driver D through the clutch 4. The motor may include a stator 51 fixed to the driver mounting groove 153 to form a rotating magnetic field, a rotor 52 rotated by the rotating magnetic field, and a driving shaft 55 rotated by the rotor 52.

Referring to FIG. 2, the stator 51 may be fixed to the fixing panel 151 through a driver bracket 54. The driver bracket 54 may be formed in a ring shape surrounding the fixing panel through-hole 155.

Figure 3:
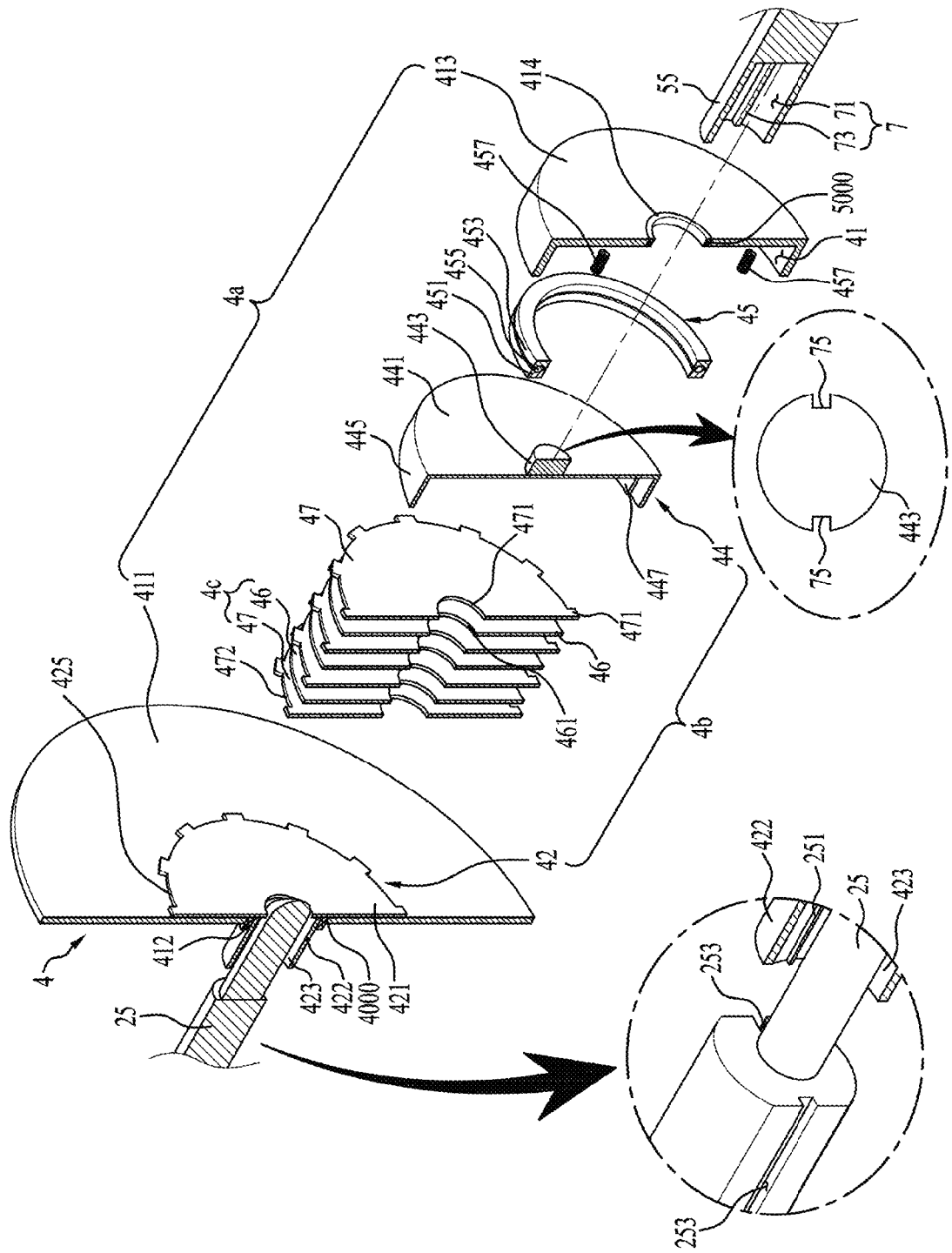
FIGS. 3 to 4B are schematic diagrams illustrating examples of a clutch and a driver according to the present disclosure.

In response to the magnitude of external force applied to the drum 2, the clutch 4 may supply rotational force of the driving shaft 55 to the drum 2, or may prevent the rotational force of the driving shaft 55 from being supplied to the drum 2. As shown in FIG. 3, the clutch 4 may include a housing 4a fixed to the fixing panel 151, and a shaft connection portion 4b rotatably provided in the housing 4a to connect or disconnect the drum shaft 25 to or from the driving shaft 55.

The housing 4a may be fixed to the fixing panel 151 to provide a space (also called a reception space) 41 in which the shaft connection portion 4b is included. The reception space 41 may include a first surface 411 formed in a direction toward the fixing panel 151, and a second surface 413 formed in a direction toward the rotor 42.

A sealing portion 156 (see FIGS. 4A and 4B) may be disposed between the first surface 411 and the fixing panel 151, so that the volume of air flowing from the inside of the flow passage forming portion 159 to the fixing panel through-hole 155 can be minimized.

The first surface 411 may include a first through-hole, and a first bearing 412 fixed to the first through-hole. The second surface 413 may include a second through-hole, and a second bearing 414 fixed to the second through-hole. The reception space 41 may communicate with the outside through the first through-hole and the second through-hole.

The shaft connection portion 4b may include a first connection portion 42 rotatably provided in the reception space 41 and connected to the drum shaft 25, a second connection portion 44 rotatably provided in the reception space 41 and connected to the driving shaft 55, and a support 45 configured to connect or disconnect the first connection portion to or from the second connection portion in response to the magnitude of external force applied to the drum 2 (i.e., the magnitude of external force that pushes the drum shaft in a direction (i.e., in a direction along which the driving shaft is located).

The first connection portion 42 may include a first connection body 421 rotatably provided in the reception space 41, a first connection shaft 422 provided in the first connection body 421 and inserted into the first through-hole, and a connection shaft through-hole 423 formed to penetrate the first connection shaft 422.

The first connection body 421 may be formed in any shape that is rotatable in the reception space 41. FIG. 3 illustrates one example in which the first connection body 421 is formed in a disc shape.

The first connection shaft 422 may be implemented as a shaft that is rotatably fixed to the first surface 411 through the first bearing 412. One end of the first connection shaft 422 should be fixed to the first connection body 421, and the other end of the first connection shaft 422 should be exposed to the outside of the reception space 41.

The connection shaft through-hole 423 may be formed to penetrate the first connection shaft 422, so that the connection shaft through-hole 423 can provide a passage in which one end (free end) of the drum shaft 25 is inserted into the reception space 41.

A drum shaft fastening portion may be provided in at least one of the drum shaft 25 and the connection shaft through-hole 423, so that the drum shaft 25 can reciprocate along the path provided by the connection shaft through-hole 423 and at the same time can transfer rotational force of the first connection shaft 422 to the drum shaft 25. FIG. 3 illustrates one example in which the drum shaft fastening portion includes a drum shaft fastening protrusion 251 located inside the connection shaft through-hole 423, and a drum shaft fastening groove 253 provided in the drum shaft 25.

The second connection portion 44 may include a second connection body 441 configured to reciprocate between the first surface 411 and the second surface 413 and detachably coupled to the first connection body 421, and may further include a second connection shaft 443 protruding from the second connection body 441 toward the second through-hole.

The second connection body 441 may be formed in any shape that is rotatable in the reception space 41. FIG. 3 illustrates one example in which the second connection body 441 is formed in a disc shape.

The second connection body 441 may include a fastening body 445 detachably coupled to the first connection body 421. The fastening body 445 may be formed in a shape in which the first connection body 421 is disposed. FIG. 3 illustrates one example in which the fastening body 445 is formed in a pipe shape in which the fastening body 445 has a larger diameter than the first connection body 421.

The first connection body 421 and the second connection body 441 may be coupled to each other through both a body fastening protrusion 445 provided in the fastening body 445 and a body fastening groove 425 provided at the circumferential surface of the first connection body 421. The body fastening groove 425 may be formed as a groove in which the circumferential surface of the first connection body 421 is concavely curved toward the center of the first connection body 421. The body fastening protrusion 447 should be formed to be inserted into the body fastening groove 425.

The driving shaft 55 provided in the driver D may be rotatably fixed to the housing 4a through the second bearing 414. In this case, the second connection shaft 443 may be connected to the driving shaft 55 through the connection shaft fastening portion 7.

The connection shaft fastening portion 7 may include a connection shaft guide 71, a connection shaft fastening protrusion 73, and a connection shaft fastening groove 75. The connection shaft guide 71 may be provided in the driving shaft 55 to provide a path in which the free end of the second connection shaft 443 is inserted. The connection shaft fastening protrusion 73 may be provided in the connection shaft guide 71. The connection shaft fastening groove 75 may include a connection shaft fastening groove 75 that is provided in the second connection shaft 443 so that the connection shaft fastening protrusion 73 is coupled to the connection shaft fastening groove 75.

The connection shaft guide 71 may be implemented as a groove formed in the longitudinal direction of the driving shaft 55, and the connection shaft fastening protrusion 73 may be implemented as a protrusion formed in the longitudinal direction of the driving shaft 55.

The above-mentioned clutch 4 may be configured to control fastening or unfastening between the first connection portion 42 and the second connection portion 441 through the support 45. FIG. 3 illustrates one example in which the support 45 is configured to be elastically deformed between the second connection body 441 and the second surface 413, so that the support 45 can provide force by which the second connection body 441 can be pressed (or pushed) in the direction in which the first connection body 421 is disposed.

That is, the support 45 shown in FIG. 3 may include a first bearing housing 451 fixed to the second connection body 44, a second bearing housing 453 connected to the first bearing housing 451 through a ball 455 or a roller, and a spring 457 in which one end is fixed to the second bearing housing 453 and the other end is fixed to the second surface 413.

In order to prevent interference between the support 45 and at least one of the driving shaft 55 or the second connection shaft 443, the first bearing housing 451 and the second bearing housing 453 may be formed in a ring shape.

Figure 4A:
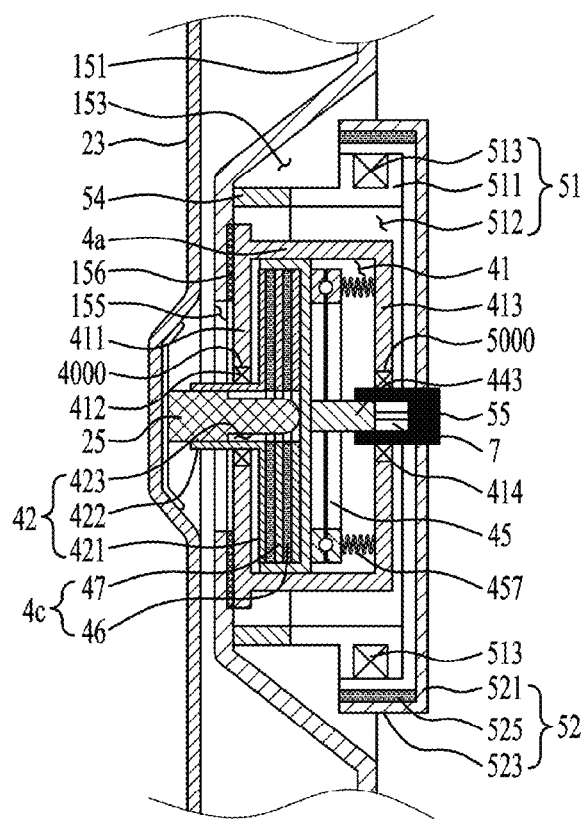
Figure 4B:
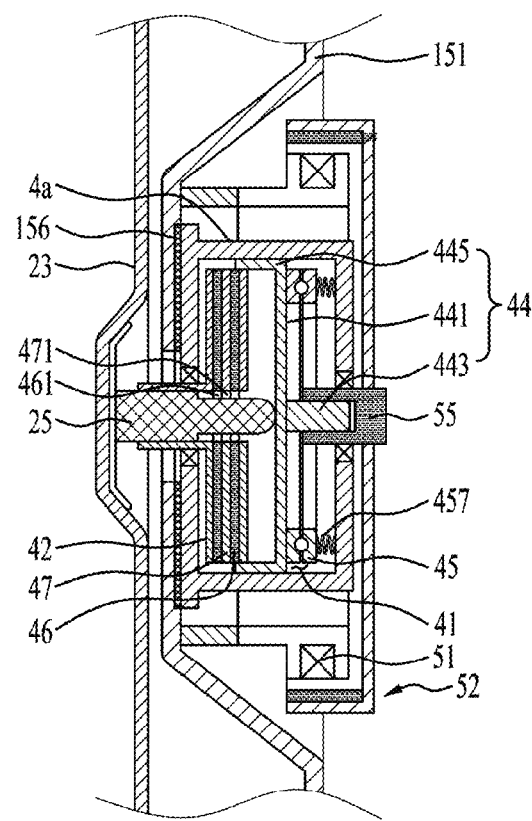

FIG. 4A illustrates an exemplary situation in which the rotational motion of the driving shaft 55 is transferred to the drum shaft 35, and FIG. 4B illustrates an exemplary situation in which the rotational motion of the driving shaft 55 is not transferred to the drum shaft 25.

Referring to FIG. 4A, assuming that external force applied to the drum 2 is less than a predetermined reference force, the clutch 4 may remain in a state where the driving shaft 55 is connected to the drum shaft 25 (i.e., a state where the rotational motion of the driving shaft is transferred to the drum shaft).

The reference external force may be configured to have a predetermined magnitude of force that pushes the drum shaft 25 in the direction of the driving shaft 55 so that the second connection portion 44 can be separated from the first connection portion 42. In other words, the reference external force may be set to a predetermined force required to compress the spring 457 by a reference distance (i.e., the movement distance for enabling the second connection portion to be separated from the first connection portion).

When the motor 5 is powered on in the situation shown in FIG. 4A, the rotor 42 and the driving shaft 55 may rotate. The rotational motion of the driving shaft 55 may be transmitted to the second connection body 441 through the second connection shaft 443, and the rotational motion of the second connection body 441 may be transmitted to the drum shaft 25 through the fastening body 445, the first connection body 421, and the first connection shaft 422.

Accordingly, when force (i.e., force that pushes the drum 2 in the direction in which the fixing panel is disposed) that pushes the drum 2 toward the rear surface of the cabinet 1 is less than the reference external force, the drum 2 may rotate with the rotor 52.

On the other hand, assuming that there occurs force that pushes the drum 2 toward the rear surface of the cabinet 1, the drum shaft 25 may push the second connection body 441 in the direction away from the first connection body 421 (i.e., in the direction in which the second surface of the housing is disposed). As illustrated in FIG. 4B, when the second connection body 441 moves away from the first connection body 421, the spring 457 may be compressed between the second connection body 441 and the second surface 413, and the fastening body 445 may be separated from the first connection body 421.

When the rotor 52 rotates in the situation shown in FIG. 4B, the rotational motion of the driving shaft 55 is transmitted to the second connection portion 44 without being transmitted to the first connection portion 42. Therefore, when the drum 2 rotates in the situation where laundry is caught in a gap between the door 114 and the lifter 26, the clutch 4 can minimize the number of occurrences of an undesirable situation in which load of the driver D is suddenly changed by external force applied to the drum 2.

In order to facilitate the operation of transmitting the rotational motion of the second connection portion 44 to the first connection portion 42, the clutch 4 may further include a frictional force providing portion 4c to increase the frictional force between the first connection body 421 and the second connection body 441.

The frictional force providing portion 4c may be implemented as a plurality of contact plates 46 and 47, each of which is formed in a shape that can be accommodated in the fastening body 445. Although FIG. 3 illustrates one example in which the contact plates are comprised of the first contact plate 46 and the second contact plate 47 that are formed of different materials for convenience of description, the scope or spirit of the present disclosure is not limited thereto, and it should be noted that the contact plate may also be comprised of any one of the first contact plate and the second contact plate as necessary.

The first contact plate 46 may be implemented as a disc formed of rubber, and the second contact plate 47 may be implemented as a disc formed of metal. A first contact plate through-hole 461 may be provided at the center of the first contact plate 46, and a second contact plate through-hole 471 may be provided at the center of the second contact plate 47. The drum shaft 25 may be inserted into the first contact plate through-hole 461 and the second contact plate through-hole 471 so that the drum shaft 25 is formed to penetrate the frictional force providing portion 4c.

In order to increase frictional force between the above-mentioned contact plates, the first contact plate 46 and the second contact plate 47 may be alternately arranged. Moreover, the circumferential surface of the second contact plate 47 may further include a contact plate fastening groove 472 to which the body fastening protrusion 447 of the fastening body is detachably coupled.

Figure 5:
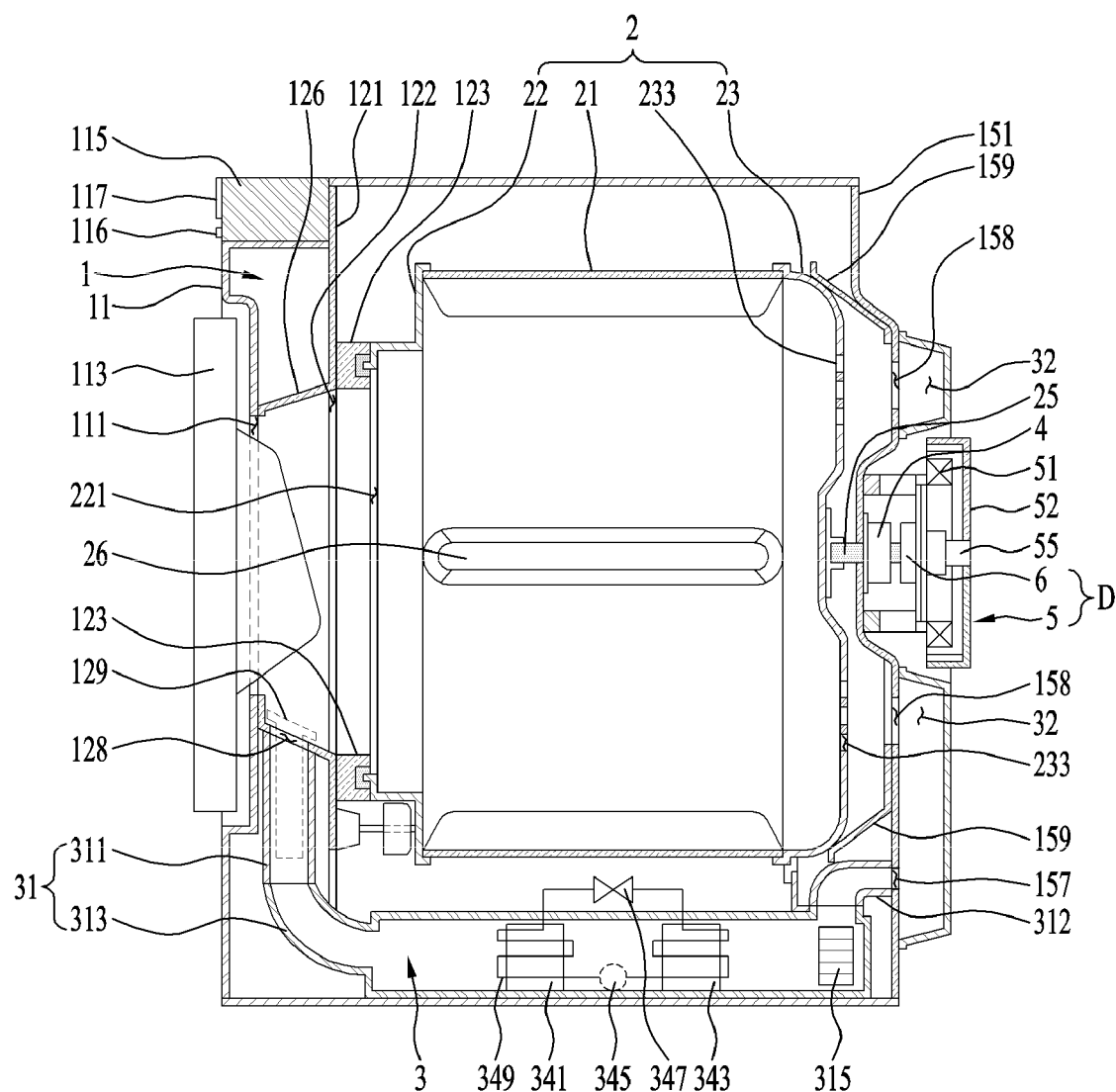
FIG. 5 is a schematic diagram illustrating another example of the laundry treatment apparatus according to the present disclosure.

FIG. 5 is a schematic diagram illustrating another example of the laundry treatment apparatus according to the present disclosure. Differently from the driver shown in each of FIGS. 1 to 4B, the driver D shown in FIG. 5 is configured in a manner that the rotational motion of the driving shaft 55 is transmitted to the second connection shaft 443 through the decelerator 6. The remaining characteristics other than connection between the second connection shaft 443 and the decelerator 6 from among characteristics of the clutch 4 shown in FIG. 5 may be identical to those of the clutch 4 shown in each of FIGS. 1 to 4B.

Figure 6:
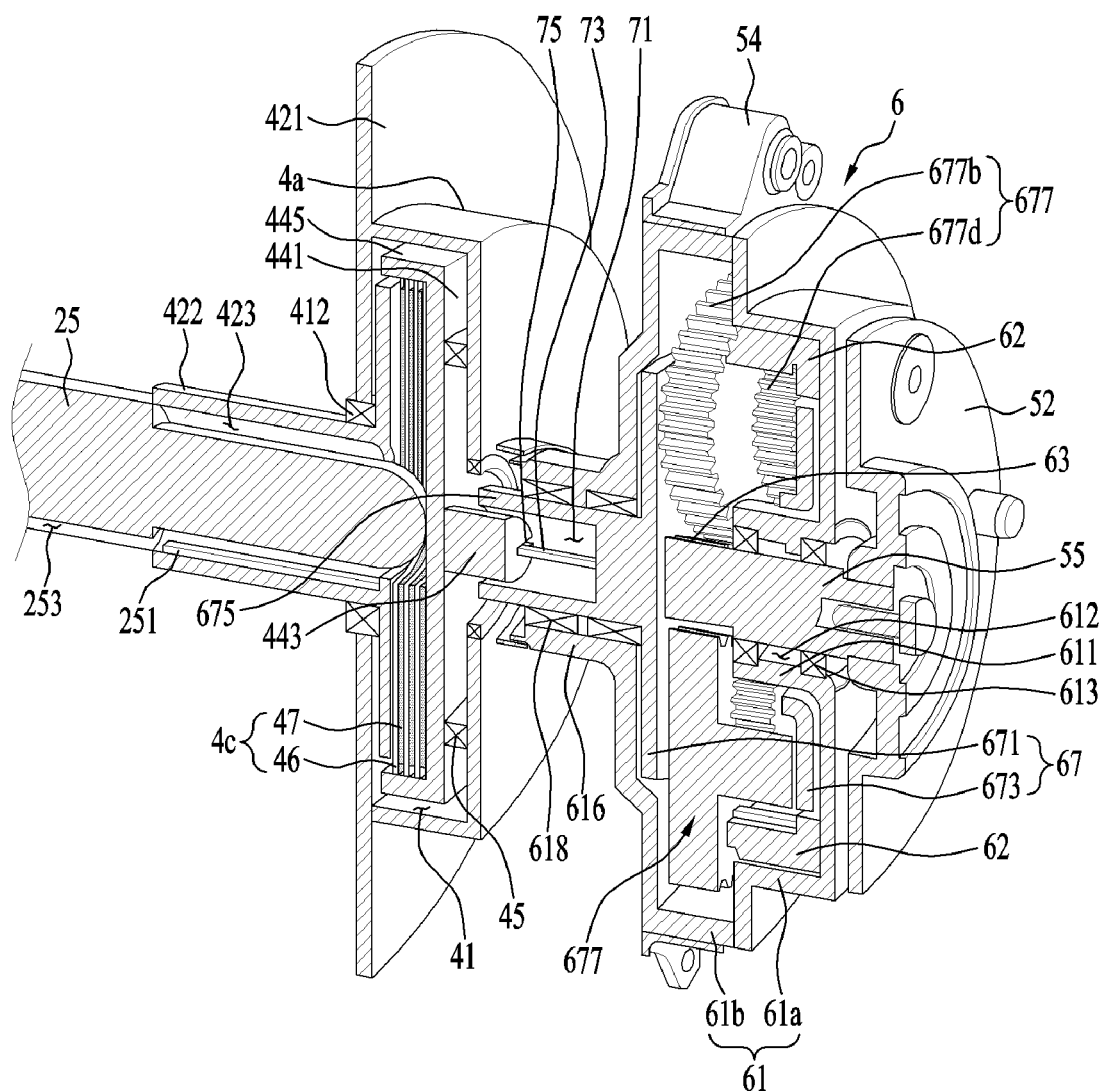
FIGS. 6, 7, 8, and 9 are schematic diagrams illustrating examples of a clutch and a decelerator according to the present disclosure.

Referring to FIG. 6, the decelerator 6 may include a deceleration housing 61 formed in a hollow cylindrical shape and fixed to the fixing panel 151, a ring gear 62 fixed to the inside of the deceleration housing, a main gear 63 fixed to the driving shaft 55 and disposed in the deceleration housing 61, and a cage 67 that can rotate in the deceleration housing 61 by a slave gear (also called a driven gear) 677 configured to interconnect the main gear 63 and the ring gear 62.

Figure 7:
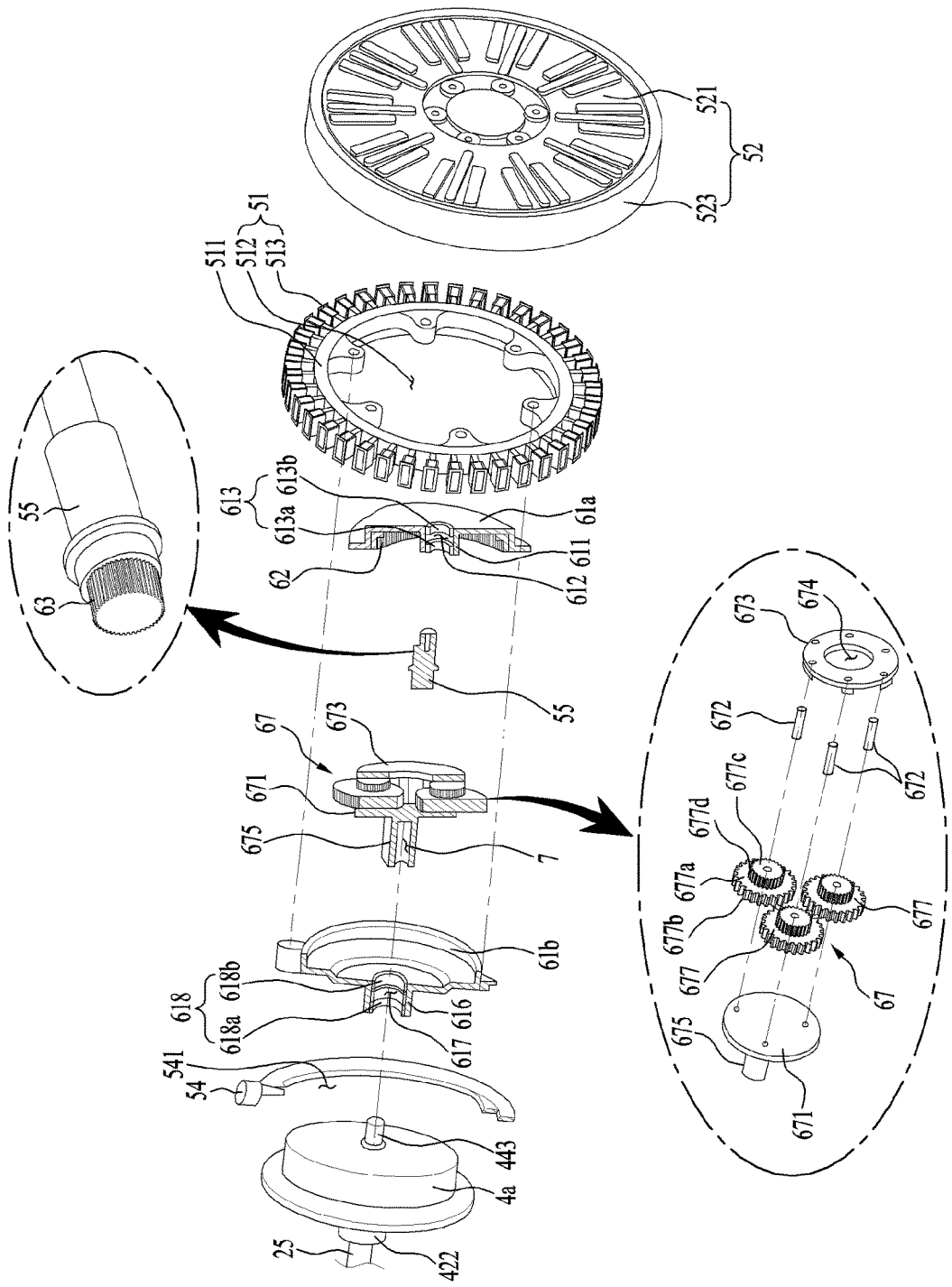

Referring to FIG. 7, the deceleration housing 61 may include a first deceleration housing 61a formed in a cylindrical shape and having an opened surface facing the fixing panel 151, and a second deceleration housing 61b formed in a cylindrical shape having an opened surface facing the first deceleration housing 61a so that the second deceleration housing 61b closes the opened surface of the first deceleration housing 61a by connecting to the first deceleration housing 61a.

The first deceleration housing 61a may include a driving shaft support 611, and a driving shaft through-hole 612 formed to penetrate the driving shaft support 611. The driving shaft 55 may be formed to penetrate the first deceleration housing 61 after being inserted into the driving shaft through-hole 612. The driving shaft support 611 may be provided with a driving shaft bearing 613 by which the driving shaft 55 is rotatably fixed to the first deceleration housing 61a.

As can be seen from FIG. 7, the driving shaft support 611 may be implemented as a pipe protruding from the first deceleration housing 61 toward the second deceleration housing 61b, so that a volume (e.g., a volume of the driver or a volume of the laundry treatment apparatus) of the housing 61 can be minimized.

The second deceleration housing 61b may include a base shaft support 616, and a base shaft through-hole 617 formed to penetrate the base shaft support 616. The base shaft 675 forming the rotary shaft of the cage 67 may penetrate the second deceleration housing 61b through the base shaft through-hole 617. The base shaft support 616 may include a base shaft bearing 618 for enabling the base shaft 675 to be rotatably fixed to the second deceleration housing 61b.

The base shaft support 616 may be implemented as a pipe (i.e., a pipe protruding toward the rear cover of the drum) protruding from the second deceleration housing 61b toward the fixing panel through-hole 155.

The driving shaft bearing 613 may include a first driving-shaft bearing 613a and a second driving-shaft bearing 613b that are provided in the longitudinal direction of the driving shaft 55. The base shaft bearing 618 may include a first base-shaft bearing 618a and a second base-shaft bearing 618b that are provided in the longitudinal direction of the base shaft 675.

When the driving shaft bearing is implemented as two or more bearings 613a and 613b and the base shaft bearing is implemented as two or more bearings 618a and 618b, the eccentricity of both the driving shaft 55 and the base shaft 675 during rotation of the rotor 52 can be minimized (i.e., vibrations generated in the driver can be minimized).

In order to minimize the volume of the deceleration housing 61, the diameter of the first deceleration housing 61a may be different from the diameter of the second deceleration housing 61b. That is, the diameter of the first deceleration housing 61a may be smaller than the diameter of the second deceleration housing 61b.

The ring gear 62 may include a ring gear body fixed to the circumferential surface of the first deceleration housing 61a, a ring gear body through-hole formed to penetrate the ring gear body, and gear teeth provided along the inner circumferential surface of the ring gear body (i.e., the circumferential surface forming the ring gear body through-hole).

The cage 67 may include a base 671 disposed in the deceleration housing 61, a base connection shaft 672 for enabling the slave gear 677 to be rotatably fixed to the base 671, and a ring-shaped base cover 673 fixed to one end of the base connection shaft 672.

The second connection shaft 443 provided in the clutch may be coupled to the base shaft 675 through the connection shaft fastening portion 7. As shown in FIG. 6, the connection shaft fastening portion 7 may include a connection shaft guide 71 provided in the free end of the base shaft 675 to provide a path in which the free end of the second connection shaft 443 is inserted, a connection shaft fastening protrusion 73 provided in the connection shaft guide 71, and a connection shaft fastening groove 75 provided in the second connection shaft 443 and coupled to the connection shaft fastening protrusion 73.

The connection shaft guide 71 may be implemented as a groove formed in the longitudinal direction of the base shaft 675, and the connection shaft fastening protrusion 73 may be implemented as a protrusion formed in the longitudinal direction of the base shaft 675.

The slave gear 677 may be implemented as a plurality of gears spaced apart from each other at intervals of the same angle. FIG. 7 illustrates one example in which the slave gear 677 is implemented as three gears spaced apart from each other by an angle of 120° and the base connection shaft 672 is implemented as three shafts spaced apart from each other at intervals of 120°.

Each of the slave gears 677 may include a first body 677a rotatably fixed to the base 671 through the base connection shaft 675, a first gear 677b provided at the circumferential surface of the first body 677a and coupled to the main gear 63, a second body 677c fixed to the first body 677a and having a smaller diameter than the first body 677a, and a second gear 677d provided at the circumferential surface of the second body 677c and coupled to the ring gear 62.

Figure 8:
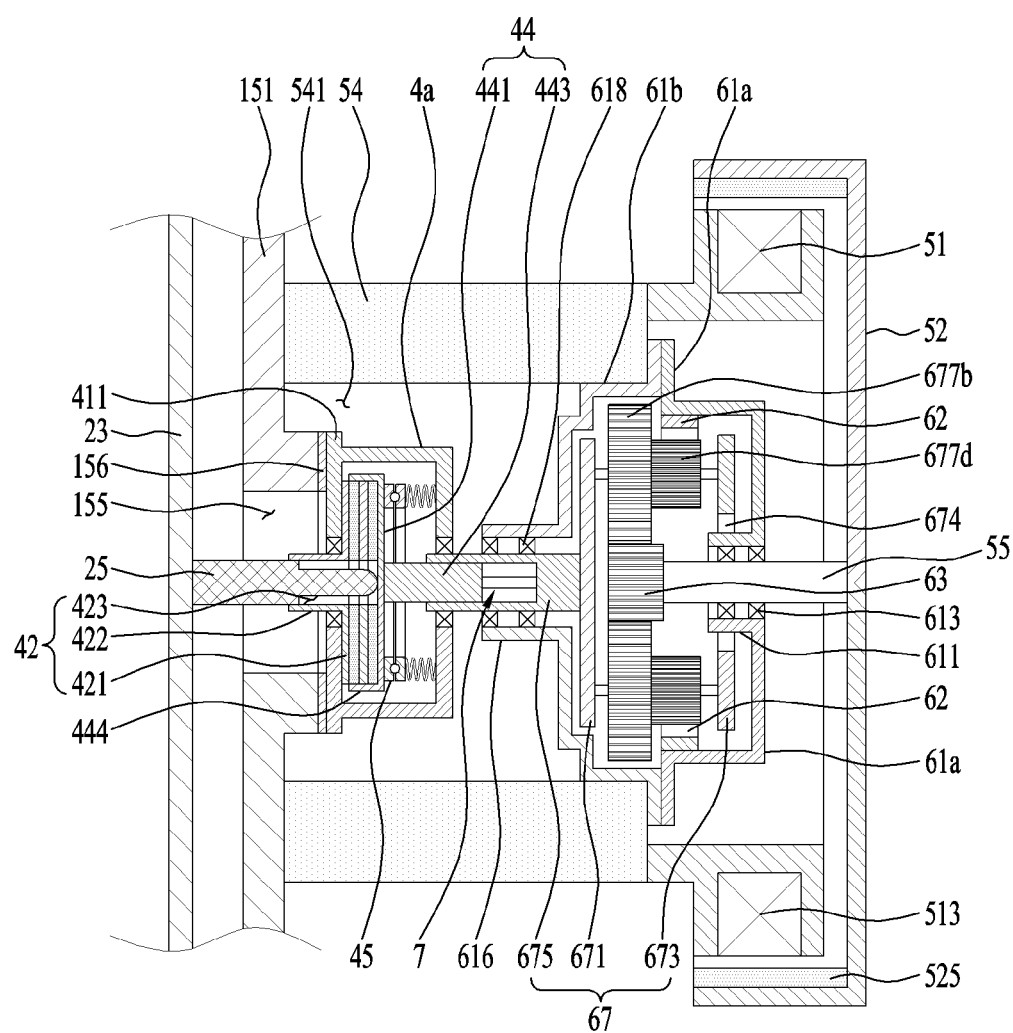

Referring to FIG. 8, the main gear 63 fixed to the free end of the driving shaft 55 may be disposed in the space between the first gears 677b, and the free end of the driving shaft support 611 may be inserted into a base cover through-hole 674 formed at the center of the base cover 673. The above-mentioned structure (i.e., the structure including the driving shaft support and the base cover) can minimize the volume of the deceleration housing 61.

In order to minimize the volume of each of the decelerator 6, the driver D and the clutch 4, the decelerator 6 and the clutch 4 may be disposed in the space formed by the driver bracket 54 and the stator 51. Alternatively, the stator 51 may be fixed to the decelerator 6 fixed to the driver bracket 54.

The driver bracket 54 may be implemented as a pipe that is provided with a bracket through-hole 541 surrounding the fixing panel through-hole 155. As shown in FIG. 7, the stator 51 may include a core 511 fixed to the free end of the driver bracket 54, a core through-hole 512 formed to penetrate the core 511, and an electromagnet 513 provided at the circumferential surface of the core 511 to provide a permanent magnet 525 of the rotor with magnetic force. In this case, the decelerator 6 and the clutch 4 may be disposed in a space formed by the bracket through-hole 541 and the core through-hole 512.

The clutch 4 may be fixed to the fixing panel 151 so that the first surface 411 closes the fixing panel through-hole 155. The decelerator 6 may be fixed to the driver bracket 54 so that the deceleration housing 61 closes the bracket through-hole 541. In this case, the sealing portion 156 may be disposed between the first surface 411 and the fixing panel 151, or may be disposed between the deceleration housing 61 and the driver bracket 54.

Figure 9:
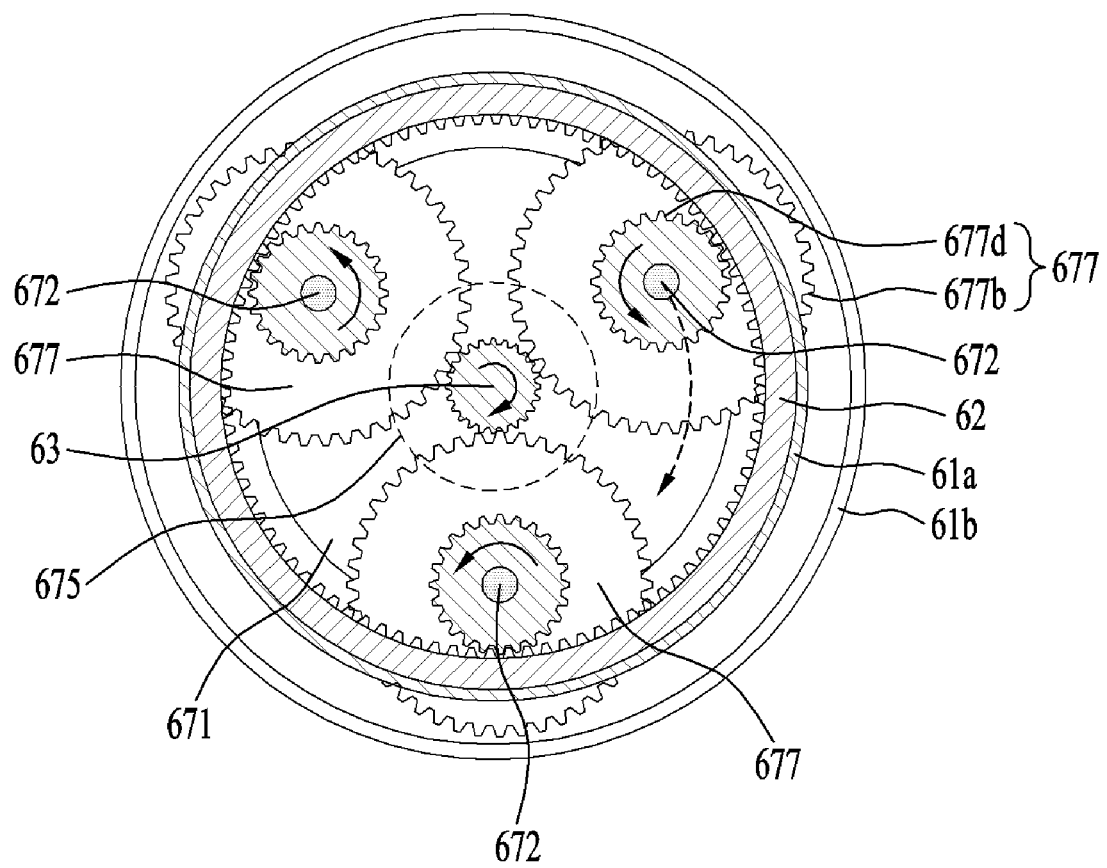

The driver D having the above-mentioned constituent elements will operate as follows. Referring to FIG. 9, when the rotor 52 rotates clockwise, the driving shaft 55 and the main gear 63 may also rotate clockwise.

When the main gear 63 rotates clockwise, the slave gears 677 will rotate
counterclockwise. Since the ring gear 62 is fixed to the fixing panel 15, the base 671 and the base shaft 675 will rotate clockwise when the slave gears 677 rotate counterclockwise.

As can be seen from FIG. 8, since the drum 2 is connected to the base shaft 675 through the clutch 4, it is expected that the drum 2 will rotate in the same direction as the rotor 52 in so far as force greater than reference external force is not input to the drum 2.

Referring to FIG. 9, the first gear 677b may have a larger diameter than the main gear 63. The second gear 677d may have a diameter that is longer than the diameter of the main gear 63 and is shorter than the diameter of the first gear 677b. Assuming that the first gear, the second gear, and the main gear are provided as described above, the driver D may enable the drum 2 to rotate at a lower RPM than the rotor 52. Although not shown in the drawings, the diameter of the second gear 677d may also be identical to the diameter of the main gear 631 as necessary.

Figure 10:
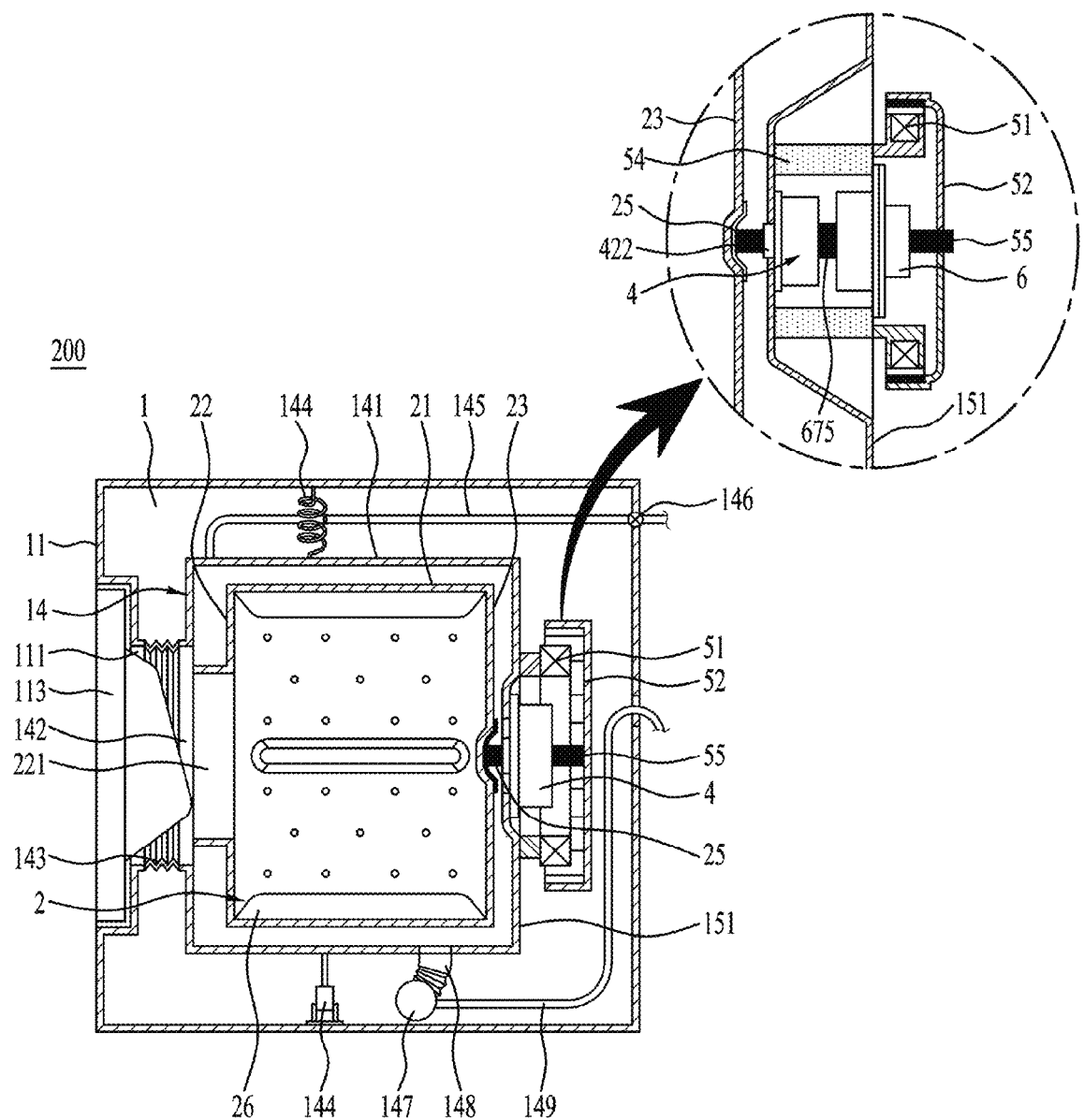
FIG. 10 is a schematic diagram illustrating still another example of the laundry treatment apparatus according to the present disclosure.

The clutch 4 and the driver D can be applied not only to the apparatus for drying laundry, but also to the apparatus for washing laundry. FIG. 10 illustrates one example in which the clutch 4 and the driver D are applied to a laundry treatment apparatus 200 for washing laundry.

Referring to FIG. 10, the laundry treatment apparatus 200 may include a cabinet 1 having an inlet 111 provided at the front panel 11, a tub 15 provided in the cabinet 1 to provide the space in which water is stored, a drum 2 provided in the tub 15 to store laundry, a motor 5 fixed to the tub 15, and a clutch 4 configured to transfer or block rotational force generated by the motor 5 to or from the drum 2.

The tub 15 may include a hollow cylindrical tub body 141, supply units 145 and 146 to supply water to the tub body 141, and drain units 147, 148, and 149 to discharge the water stored in the tub body 141 to the outside of the cabinet.

The tub body 141 may be fixed into the cabinet 1 through a tub support 144. A tub inlet 142 connected to the inlet 111 through a cylindrical gasket 143 may be provided at the front surface of the tub body 141.

The water supply unit may include a water supply pipe 145 for connecting a water supply source to the tub body 141, and a water supply valve 146 for controlling opening or closing of the water supply pipe 145. The drain unit may include a first drain pipe 148 for connecting the tub body to the pump, and a second drain pipe 149 for guiding water discharged from the pump to the outside of the cabinet 1.

Although not shown in the drawings, the laundry treatment apparatus shown in FIG. 10 may further include a supply unit for removing moisture from laundry stored in the drum by supplying air to the tub body 141. The supply unit may include an exhaust duct for discharging air stored in the tub body to the outside of the tub body, a heat exchanger provided in the exhaust duct to sequentially perform dehumidification and heating of the air, and a supply duct for guiding the air having penetrated the heat exchanger to the tub body.

In the laundry treatment apparatus shown in FIG. 10, the rear surface of the tub body 141 may serve as the fixing panel 151 shown in FIGS. 1 to 9. That is, the housing 4a of the clutch may be fixed to the rear surface of the tub body 141, and the stator 141 of the motor may be fixed to the driver bracket 54 fixed to the rear surface of the tub body 141. Moreover, the driver D provided in the laundry treatment apparatus shown in FIG. 10 may be designed to further include the decelerator 6. The structures of the clutch 4 and the decelerator 6 are identical to those of the above-mentioned embodiments, and as such a detailed description thereof will herein be omitted for convenience of description.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A laundry treatment apparatus comprising:
    a housing defining a reception space;
    a first through-hole that is in communication with the reception space and that is defined at a first surface of the housing;
    a second through-hole that is in communication with the reception space and that is defined at a second surface facing the first surface;
    a first connection portion including (i) a first connection body rotatably provided in the reception space, (ii) a first connection shaft inserted into the first through-hole, and (iii) a connection shaft through-hole defined at the first connection shaft;
    a second connection portion including (i) a second connection body that is provided in the reception space and that is configured to reciprocate between the first surface and the second surface of the housing, (ii) a fastening body that is provided in the second connection body and that is detachably coupled to the first connection body, and (iii) a second connection shaft that protrudes from the second connection body toward the second through-hole;
    a drum defining a space that is configured to receive laundry;
    a drum shaft that has a first end fixed to the drum and a second end inserted into the connection shaft through-hole and that is configured to interconnect the drum and the first connection shaft;
    a driver including (i) a driving shaft that is rotatably fixed to the second through-hole and that defines a concentric shaft along with the drum shaft and (ii) a motor configured to rotate the driving shaft;
    a connection shaft fastening portion that is disposed at the driving shaft, that defines a space in which a first end of the second connection shaft is inserted, and that is configured to transmit rotational motion of the driving shaft to the second connection shaft; and
    a support that is configured to be elastically deformed between the second connection body and the second surface and that is configured to press the second connection body toward the first connection body such that the first connection body is coupled to the fastening body.

2. The laundry treatment apparatus according to claim 1, wherein the support includes:
    a first bearing housing fixed to the second connection body;
    a second bearing housing connected to the first bearing housing through a ball or a roller; and
    a spring that has a first end fixed to the second bearing housing and a second end fixed to the second surface.

3. The laundry treatment apparatus according to claim 1, further comprising:
    a body fastening groove that is provided at a circumferential surface of the first connection body having a disc shape; and
    a body fastening protrusion that is provided in the fastening body and that is detachably coupled to the body fastening groove.

4. The laundry treatment apparatus according to claim 3, further comprising:
    a frictional force providing portion that is provided in the fastening body and that is configured to increase frictional force between the first connection body and the second connection body.

5. The laundry treatment apparatus according to claim 4, wherein:

the frictional force providing portion includes at least one of (i) a first contact plate having a disc shape and made of rubber and (ii) a second contact plate having a disc shape and made of metal.

6. The laundry treatment apparatus according to claim 5, further comprising:
a contact plate fastening groove that is provided at a circumferential surface of the second contact plate and that is detachably coupled to the body fastening protrusion.

7. The laundry treatment apparatus according to claim 1, further comprising:
a tub that defines a space configured to receive water and that has a first surface to which the housing is fixed, wherein the drum is provided in the tub.

8. The laundry treatment apparatus according to claim 1, further comprising:
a supply unit configured to remove moisture from laundry received in the drum by supplying air to the drum.

9. A laundry treatment apparatus comprising:
a fixing panel;
a housing that is fixed to the fixing panel and that defines a reception space;
a first through-hole that is in communication with the reception space and that is defined at a first surface of the housing;
a second through-hole that is in communication with the reception space and that is defined at a second surface facing the first surface;
a first connection portion including (i) a first connection body rotatably provided in the reception space, (ii) a first connection shaft inserted into the first through-hole, and (iii) a connection shaft through-hole defined at the first connection shaft;
a second connection portion including (i) a second connection body that is provided in the reception space and that is configured to reciprocate between the first surface and the second surface, (ii) a fastening body that is provided in the second connection body and that is detachably coupled to the first connection body, and (iii) a second connection shaft that protrudes from the second connection body toward the second through-hole and that defines a concentric shaft along with the first connection shaft;
a drum defining a space that is configured to receive laundry;
a drum shaft that has a first end fixed to the drum by passing through the fixing panel and a second end inserted into the connection shaft through-hole and that defines a concentric shaft along with the second connection shaft;
a motor including (i) a stator fixed to the fixing panel to generate a rotating magnetic field, (ii) a rotor rotated by the rotating magnetic field, and (iii) a driving shaft that is configured to be rotated by the rotor and that defines a concentric shaft along with the second connection shaft;
a decelerator that is disposed between the second connection shaft and the driving shaft and that is configured to transmit rotational motion of the driving shaft to the second connection shaft so that a number of revolutions per minute (RPM) of the second connection shaft is configured to be lower than a number of RPM of the driving shaft; and
a support that is configured to be elastically deformed between the second connection body and the second surface and that is configured to press the second connection body toward the first connection body such that the first connection body is coupled to the fastening body.

10. The laundry treatment apparatus according to claim 9, wherein the decelerator includes:
a deceleration housing that has a hollow cylindrical shape and that is fixed to the fixing panel;
a ring gear fixed in the deceleration housing;
a main gear that is fixed to the driving shaft and that is provided in the deceleration housing;
a base provided in the deceleration housing;
a base shaft that has a first end located outside the deceleration housing by passing through the deceleration housing and a second end fixed to the base and that defines a concentric shaft along with the driving shaft;
a slave gear including (i) a first body rotatably fixed to the base, (ii) a first gear that is provided at a circumferential surface of the first body and that is coupled to the main gear, (iii) a second body that is fixed to the first body and that has a diameter shorter than the first body, and (iv) a second gear that is provided at a circumferential surface of the second body and that is coupled to the ring gear; and
a connection shaft fastening portion that is provided at a first end of the base shaft, that defines a space in which a first end of the second connection shaft is inserted, and that is configured to transmit rotational motion of the base shaft to the second connection shaft.

11. The laundry treatment apparatus according to claim 10, wherein:
a diameter of the first gear is greater than a diameter of the main gear, and
the diameter of the second gear is (i) greater than the diameter of the main gear and (ii) less than the diameter of the first gear.

12. The laundry treatment apparatus according to claim 11, wherein the deceleration housing includes:
a first deceleration housing that has a cylindrical shape and that defines an opening facing the fixing panel so that the driving shaft is rotatably fixed to the first deceleration housing,
a second deceleration housing that has a cylindrical shape, that is disposed between the first deceleration housing and the fixing panel, that is rotatably fixed to the base shaft, and that closes the opening of the first deceleration housing by connecting to the first deceleration housing,
a driving shaft support that protrudes from the first deceleration housing toward the second deceleration housing,
a driving shaft through-hole that is defined at the driving shaft support so that the driving shaft is inserted through the driving shaft through-hole, and
a driving shaft bearing configured to allow the driving shaft to be rotatably fixed to the driving shaft support.

13. The laundry treatment apparatus according to claim 12, wherein the driving shaft bearing includes:
a first driving-shaft bearing and a second driving-shaft bearing provided in a longitudinal direction of the driving shaft.

14. The laundry treatment apparatus according to claim 12, further comprising:
a base shaft support fixed to the second deceleration housing;
a base shaft through-hole defined at the base shaft support so that the base shaft is inserted through the base shaft through-hole; and a first base-shaft bearing and a second base-shaft bearing that are configured to allow the base shaft to be rotatably fixed to the base shaft support and that are provided in a longitudinal direction of the base shaft.

15. The laundry treatment apparatus according to claim 9, wherein the support includes:
   a first bearing housing fixed to the second connection body;
   a second bearing housing connected to the first bearing housing through a ball or a roller; and
   a spring that has a first end fixed to the second bearing housing and a second end fixed to the second surface.

16. The laundry treatment apparatus according to claim 9, further comprising a cabinet having a rear surface defined by the fixing panel.

17. The laundry treatment apparatus according to claim 16, further comprising a rear support including the fixing panel.

18. The laundry treatment apparatus according to claim 9, further comprising:
   a driver mounting groove to which the driver is mounted and provided in the fixing panel.

19. The laundry treatment apparatus according to claim 18, wherein the driver mounting grooved is defined based on the fixing panel being concavely curved toward a rear cover of the drum.

20. The laundry treatment apparatus according to claim 9, further comprising:
   a supply duct that is configured to guide air and that is fixed to the fixing panel.

* * * * *